United States Patent Office 2,876,527
Patented Mar. 10, 1959

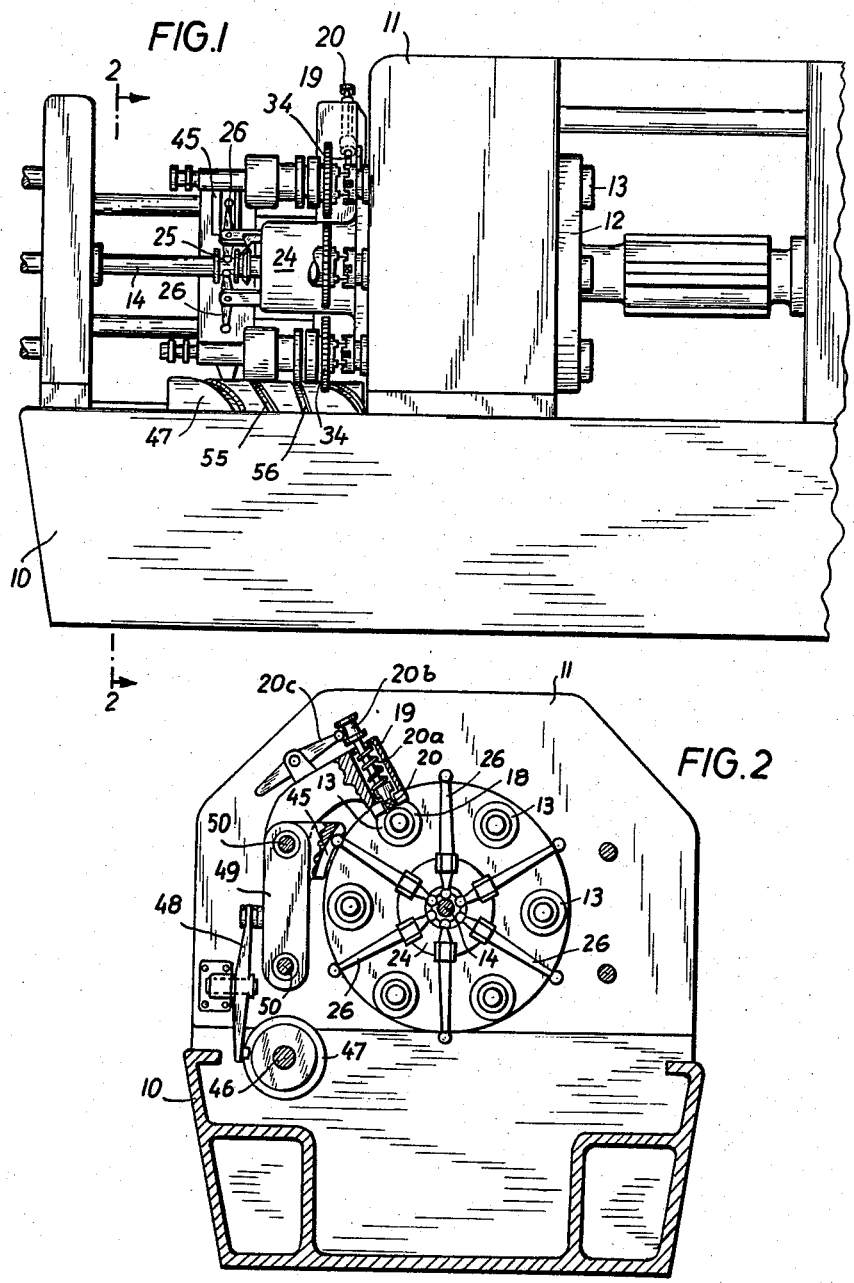

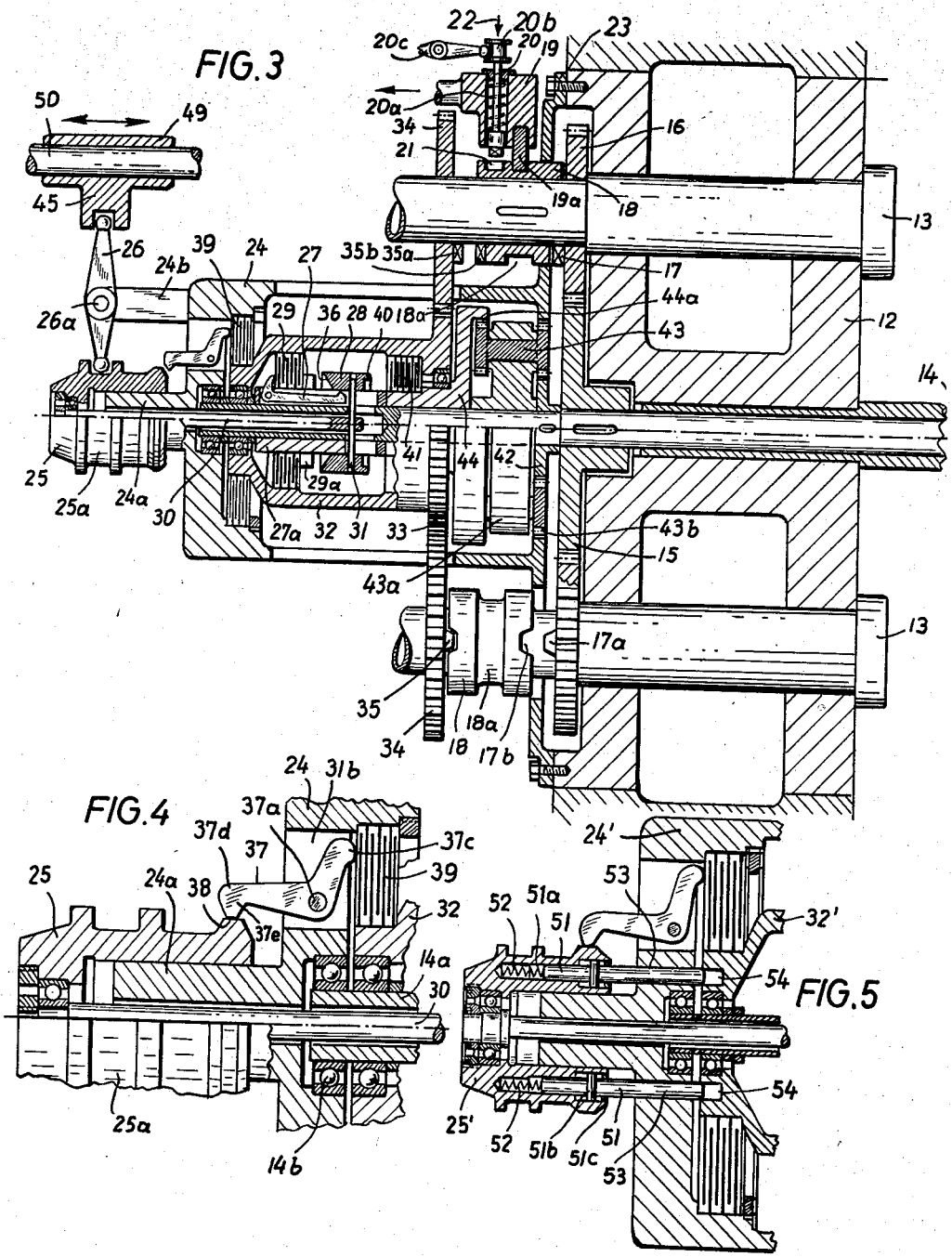

2,876,527
ARRESTING DEVICE FOR THE WORK SPINDLES OF MULTIPLE-SPINDLE AUTOMATIC LATHES

Stefan Matlachowsky, Gutersloh, Germany, assignor to Alfred H. Schutte, Koln-Deutz, Germany, a company of Germany Application June 13, 1957, Serial No. 665,525

Claims priority, application Germany June 22, 1956

16 Claims. (Cl. 29—38)

This invention relates generally to arresting devices for the work spindles of multiple-spindle automatic lathes.

When it is desired to perform those operations on multiple-spindle automatic lathes which generally can be performed only on a work piece which is at rest, such as, for example, drilling or milling at right angles to the axis of rotation of the work spindle, or drilling of eccentric holes where such operation cannot be performed with rotating drill chucks, it is necessary to arrest the individual spindle in the position in which the operation is to be performed and to hold the arrested spindle against rotation while the other spindles of the lathe continue rotating.

In some existing arresting devices, the work spindle is disengaged from its drive wheel by means of a clutch, and the spindle then slows down and is stopped by means of a brake mounted concentrically with respect to the arrested spindle. Such arresting devices are not satisfactory, as the position of the arrested spindle, following its stopping by the brake, is not definitely determined, as by a locking pin or other similar device.

In other existing arresting devices, the spindle is held in a predetermined arrested position by a gear coupling or locking pin, and such an arrangement requires that the spindle, after being stopped by the associated brake, be rotated briefly at a low speed to permit proper engagement of the gear coupling or locking pin. Various methods have been employed to effect the low speed rotation of the work spindle necessary for proper engagement of the gear coupling or locking pin determining the arrested position. The simplest of these methods is to permit the clutch interposed in the drive of the spindle to slip partially until the gear coupling or locking pin engages. However, particularly in the case of high speed drives, the partial engagement of the clutch may cause the spindle to start its rotation to rapidly and thereby to produce damaging impacts against the arresting gear coupling or locking pin, or the partially engaged clutch may provide an inadequate driving force so that the engagement of the locking pin or gear coupling may be insecure. Other attempts at providing the necessary low speed rotation of the spindle employ friction wheels which are independently driven and pressed against the outer periphery of the spindle to rotate the latter after it has been brought to a halt by the associated brake. Still another known design provides means for grasping the end of the spindle to be arrested and a slow drive for turning the grasped spindle into its arrested position, but such an arrangement is feasible only with multiple-spindle automatic lathes having automatic chucks.

All of the above described existing devices require a special drive for each spindle which is to be arrested, and such special drive may have to be different for an automatic chuck lathe than for an automatic bar machine. Further, with the existing devices, the arrested spindle, upon its return to a condition of normal rotation, is not in synchronism with the other spindles, that is, the spindle, upon being returned to its normal rotating condition, does not have the same radial position, with respect to the other spindles, that it had before being arrested, and this disadvantage is particularly important when working with profiled material on a bar machine or with unsymmetrical work pieces on an automatic chuck lathe.

Accordingly, it is an object of the present invention to provide an arresting device for multiple-spindle automatic lathes which is the same both for automatic chuck and bar machines, and which may be used for simultaneously arresting any one or any number of the spindles, and which returns each spindle to the operating cycle in the same relative radial position with respect to the other spindles that it had prior to being arrested.

In accordance with an aspect of the present invention, each of the spindles has a coupling for selectively connecting the related spindle either to the main high speed drive, for the usual operations requiring rotation of the spindle, or to an auxiliary or arresting drive which is centrally located, that is, concentric with the axis of the spindle drum, and the central arresting drive includes a relatively high speed portion to facilitate engagement of the selected individual spindle couplings therewith, a brake for decelerating the spindle or spindles coupled to the auxiliary or arresting drive and a very slow speed drive portion for turning the coupled spindle or spindles until the rotation of the latter is finally arrested in a predetermined position by engagement therewith of a locking pin.

Preferably, the high speed and low speed drive portions of the auxiliary or arresting drive are connected to the central drive shaft of the automatic lathe by selectively engageable and disengageable disc clutches, while deceleration of the spindle or spindles coupled to the arresting drive is effected by a disc brake, and an axially slidable gear shift sleeve is mounted on the central drive shaft of the lathe to effect actuation of both of the disc clutches as well as of the disc brake, thereby to simplify control of the arresting drive.

If it is desired to arrest only one, or at most a few, of the spindles in each indexed position of the spindle drum, the coupling for connecting each spindle either to the main drive or to the auxiliary or arresting drive may be in the form of a coupling sleeve rotatable with the spindle, but axially slidable on the latter, and having a recess or notch therein adapted to receive a locking pin which is pressed against the sleeve to engage in the recess when the related spindle has attained the predetermined arrested position. However, if it is desired to provide for the simultaneous arresting of all of the work spindles, the axially slidable gear shift sleeve which is provided for actuation of the disc clutches and of the disc brake may also have pin extending axially therefrom for engagement in recesses of a rotated part of the arresting drive during operation of the very slow speed portion of the latter, thereby to lock the arresting drive and, hence, simultaneously lock or arrest all of the spindles which are then coupled thereto.

The above, and other objects, features and advantages of the invention, will be apparent in the following detailed description of illustrative embodiments thereof which is to be read in connection with the accompanying drawing forming a part hereof, and wherein:

Fig. 1 is a side elevational view of a portion of a multiple-spindle automatic lathe having an arresting device for the work spindles thereof embodying the present invention, but with some of the parts of the device being omitted for the purposes of clarity;

Fig. 2 is a sectional view taken along the line 2—2 of Fig. 1;

Fig. 3 is an enlarged sectional view of the spindle drum and of the arresting device of Figs. 1 and 2 in a vertical plane extending through the axis of the spindle drum;

Fig. 4 is an enlarged detail view, partly in section, of a portion of the arresting device of Figs. 1, 2 and 3; and Fig. 5 is a fragmentary sectional view illustrating a modification of the arresting device appearing in Figs. 1 to 4 inclusive.

Referring to the drawings in detail, and initially to Figs. 1 and 2 thereof, it will be seen that a multiple-spindle automatic lathe having an arresting device in accordance with the present invention includes the usual base 10 supporting a headstock 11 on which a spindle drum 12 is rotatably mounted. The drum 12 carries a plurality of work spindles 13 which are spaced equally from the axis of rotation of the drum and extend parallel to such axis. All of the work spindles 13 are driven from a central drive shaft 14 of the lathe.

As seen in Fig. 3, the main or usual high speed drive for the spindles 13 includes a spur gear 15 which is keyed or otherwise secured on the central drive shaft 14 and which meshes with a spur gear 16 mounted on each of the spindles 13 for rotation independent of the latter. Each spindle 13 has a gear shift or coupling sleeve 18 mounted thereon and being fixed for rotation with the related spindle while being free to move axially relative to the latter. Each gear 16 is provided with an axially extending tooth 17a whereas the adjacent end of the related sleeve 18 has a cooperating axially extending recess 17b as shown at the bottom of Fig. 3, both of which form a claw coupling or clutch 17. The coupling 17 is engaged when the sleeve 18 is moved axially toward the gear 16, as the top of Fig. 3, while the coupling 17 is disengaged, as at the bottom of Fig. 3, in response to axial movement of sleeve 18 in the direction away from the related gear 16. When the coupling 17 is engaged, it is apparent that the related spindle 13 will be driven from the main drive shaft 14 by way of the gears 15 and 16, the coupling 17 and the sleeve 18.

In order to effect axial sliding movement of the sleeve 18, a slide 19 is mounted on the frame of the lathe adjacent each of the working positions where a spindle is to be arrested, and is movable in the direction parallel to the axes of the spindles successively located at the related working position. A member 19a projects from the slide 19 and is engageable in an annular, radially outward opening groove 18a formed in the sleeve 18 on the spindle located at the related working position. Thus, the sleeve 18 of a spindle 13 located at the working position of the slide 19 may be axially displaced for engagement and disengagement of the coupling 17 by suitably effecting corresponding sliding movements of the slide 19.

A locking pin 20 is slidably mounted in the slide 19 for movement in a direction extending radially with respect to the axis of a spindle at the related working position, and the pin 20 is yieldably urged by a spring 20a in the direction of the arrow 22, that is, in the direction toward the sleeve 18, thereby to press against the outer surface of the latter. Each sleeve 18 has a radially outward opening recess 21 which, when the pin 20 is pressed against the sleeve 18, eventually registers with the pin to receive the latter and thereby to lock the sleeve 18, and hence the related spindle 13 against further rotation in a predetermined rotated position.

In accordance with the present invention, the multiple-spindle automatic lathe is provided with an arresting or auxiliary drive for the spindles 13. Such arresting drive includes a housing 24 which is concentric with the axis of rotation of the spindle drum 12 and which is provided with a radially extending flange 23 bolted, at its outer periphery, to the spindle drum. The housing 24 has a hollow, cylindrical extension 24a at the end thereof remote from the drum 12, and a control sleeve 25 is movably mounted upon the extension 24a. The housing 24 further has a support arm 24b extending therefrom for each of the spindles 13, and each carrying a control lever 26 which is pivoted, as at 26a intermediate its opposite ends. One end of each control lever 26 is received in a radially outward opening annular groove 25a provided in the outer surface of the sleeve 25 so that the latter may be axially displaced on the extension 24a in response to rocking of any one of the levers 26.

A hollow end portion 14a of the main drive shaft 14 extends axially within the housing 24 and, at its end, is rotatably supported within a suitable bearing 14b (Fig. 4). A cylindrical housing 32 is mounted within the housing 24 for rotation with respect to the latter and with respect to the main drive shaft 14. A sleeve 27a extends around the hollow portion 14a of the main drive shaft within the cylindrical housing 32, and a disc clutch 29 is provided between the housing 32 and the sleeve 27a so that, when the successive discs of the clutch 29, which are alternately connected to the housing 32 and the sleeve 27a, are axially compacted, the clutch 29 is effective to transmit rotation of the sleeve 27a with the main drive shaft 14 to the housing 32.

In order to effect engagement of the clutch 29, an actuating bell crank 27 (Fig. 3) is pivotally mounted in the sleeve 27a for movement in a radial plane. The bell crank 27 includes a substantially vertical arm which engages an end disc of the clutch 29 at one side of the latter, while an abutment 29a is fixed upon the sleeve 27a at the opposite side of the clutch 29. The bell crank 27 further includes a substantially horizontal arm which is adapted to be acted upon by a cam sleeve 28 slidable upon the sleeve or bushing 27a. Axial movement of the cam sleeve 28 for controlling the position of the bell crank 27 is effected by means of a plunger 30 which extends axially from the control sleeve 25 into the hollow end portion 14a of the drive shaft 14 and which carries a diametrically extending pin 31. The pin 31 passes radially through suitable axially elongated slots in the end portion 14a of the shaft and in the sleeve 27a, and the opposite ends of the pin 31 are received in radial openings within the cam sleeve 28. Thus, the pin 31 connects the cam sleeve 28 to the plunger 30 for axial movement with the control sleeve 25 and also serves as a rotatable coupling between the main drive shaft 14 and the sleeve 27a.

When the clutch 29 is disengaged, that is, when the discs thereof are not axially compacted, the free end of the substantially horizontal arm of the bell crank 27 will project radially outward beyond the outer surface of sleeve 27a. The end edge of the cam sleeve 28 facing in the direction toward the clutch 29 is inwardly beveled, as at 36, so that, when the sleeve 28 is moved axially toward the left, as viewed in Fig. 3, the beveled edge 36 thereof will engage the free end of the substantially horizontal arm of bell crank 27 and will rock the latter, in the clockwise direction as viewed in Fig. 3, thereby to effect engagement of the clutch 29.

The housing 32 has a ring gear 33 formed thereon which meshes with spur gears 34 rotatably mounted on the spindles 13. Thus, when the clutch 29 of the auxiliary or arresting drive is engaged, as described above, the spur gears 34 on the several spindles 13 will all be rotated at a speed depending upon the ratio of the teeth on the spur gears 34 and the ring gear 33. Preferably, such gear ratio is selected so that the spur gears 34 will rotate at a speed which is only slightly less than the rotational speed of the spindles 13 when the latter are driven by the main drive, that is, by the meshing gears 15 and 16.

As seen in Fig. 3, each spur gear 34 is provided with an axially extending tooth 35a whereas the adjacent end of the sleeve 18 on the related spindle has a cooperating axially extending recess 35b both of which are adapted to form a claw coupling or clutch 35 between the gear 34 and the related sleeve 18. The gears 16 and 34 spaced axially apart by a sufficient distance so that, when the sleeve 18 is moved axially in the direction toward the gear 16 to engage the coupling 17, the coupling 35 will be disengaged, as shown in the upper part of Fig. 3 and, when the sleeve 18 is moved axially toward the gear 34 in order to engage the coupling 35, the coupling 17 will be disengaged, as shown in the lower part of Fig. 3.

The auxiliary or arresting drive embodying the present invention further includes a disc brake 39 having its alternate discs connected to the housing 24 and to the housing 32, respectively. Since the housing 24 is secured to the spindle drum 12, and therefore is non-rotatable in any working position of the lathe, it is apparent that axial compaction of the discs of the brake 39 will serve to brake the rotation of the housing 32.

The disc brake 39 is adapted to be applied by a bell crank 37 which is rockably mounted, as at 37a, within a slot 37b in an end wall of housing 24, and which has a substantially vertical arm 37c engageable axially against the brake 39 and a substantially horizontal arm 37d projecting out of the housing (Fig. 4). The control sleeve 25 has an annular, outwardly projecting ridge 38 thereon adapted to engage the arm 37d when the sleeve 25 is axially shifted toward the right, as viewed in Figs. 3 and 4, thereby to effect clockwise rocking of the bell crank 37 for applying the brake 39. Since the cam sleeve 28 is connected, by the pin 31 and the plunger 30, for axial movement with the sleeve 25, it is apparent that the sleeve 28 will also move toward the right, during application of the brake 39. Such axial movement of the sleeve 28 will permit the end of the substantially horizontal arm of the bell crank 27 to ride outwardly along the beveled edge 36 of sleeve 28, thereby to provide for disengagement of the clutch 29 as the brake 39 is applied.

The auxiliary or arresting drive embodying the present invention further includes a pinion 42 fixed on the main drive shaft 14, planetary gears 43 carried by a spider 43a which is rotatable on the shaft 14 and meshing with the pinion 42 and with a ring gear 43b formed as a part of the housing 24, so that, as the planetary gears 43 are rotated by the driven pinion 42, the spider 43a will turn relative to the shaft 14. The planetary gears 43 further mesh with a ring gear 44a formed on a hub 44 which is also rotatable with respect to the drive shaft 14, the teeth on the gears 42, 43, 43b and 44a being selected so that the hub 44 will rotate at a very slow speed.

A disc clutch 41 has its alternate discs secured to the hub 44 and to the housing 32 so that, when the discs of the clutch 41 are axially compacted, the very slow rotation of the hub 44 will be transmitted to the housing 32 and, by way of the gears 33 and 34, to any one of the spindles 13 then having its coupling 35 in engaged condition.

In order to axially compact the discs of the clutch 41, and thereby to engage the latter, the end of the cam sleeve 28 facing toward the clutch 41 is formed with a lip 40 to bear axially against the disc 41 in response to axial movement of the control sleeve 25 toward the right, as viewed in Fig. 3, beyond the position where the brake 39 is applied. As is seen in Fig. 4, the arm 37d of bell crank 37 has a nose 37e depending therefrom for engagement with the ridge 38, so that, when the sleeve 25 has moved toward the right to engage the clutch 41, the nose 37e can move downwardly off the ridge 38, thereby to release the brake 39, so that the housing 32 can then be rotated at the slow speed transmitted by the clutch 41.

As is shown in Figs. 1 and 2, each working position of the lathe where a spindle 13 is to be arrested is provided with a cam plate 45 adapted to receive the outer end of the lever 26 associated with the spindle 13 then disposed at that working position. The cam plate 45 is mounted on a slide 49 which is slidable on axially extending support rods 50 so that the desired axial shifting of the control sleeve 25 for first engaging the clutch 29, then applying the brake 39 and finally engaging the clutch 41 can be achieved by effecting corresponding sliding movements of the slide 49 on the support rods 50. In order to effect such sliding movements of the slide 49, a drum type cam 47 is mounted on a rotatable control shaft 46 and is engaged by a cam follower lever 48 which is pivotally coupled to the slide 49. Thus, as the cam 47 is rotated, the slide 49, and hence also the control sleeve 25, are moved back and forth, in accordance with the shape of the slot in the cam 47, to produce the necessary sequence of operations within the auxiliary or arresting drive.

It will be apparent that the described arresting drive can take over control of the rotation of a work spindle 13 at any one of the working positions of the lathe only when the slide 19 at that working position is shifted, as previously indicated, in the direction for disengaging the coupling 17 and engaging the coupling 35 of that work spindle. Further, although the locking pin 20 of the slide 19 is urged by the spring 20a against the sleeve 18 for engagement in the related recess 21, it will be seen in Figs. 2 and 3 that the outer end of the pin 20 is provided with a grooved collar 20b receiving one end of a rockable control lever 20c. Thus, the pin 20 can be withdrawn from the recess 21, or prevented from entering the latter, by rocking of the lever 20c in the counter-clockwise direction, as viewed in Figs. 2 and 3.

The shifting movements of the slide 19 which cause the sleeve 18 to engage or disengage the related couplings 17 and 35 and the working of the lever 20c which effects the withdrawal of the pin 20 from the recess 21 are effected by control levers (not shown), the movements of which are controlled by cam slots 55 and 56 in the drum type cam 47.

The above described embodiment of the present invention operates as follows:

The cam slot 55 in the drum type cam 47 and the rotation of the control shaft 46 are selected with respect to the operation of the mechanism (not shown) for effecting shifting movements of the slide 19 so that, following indexing of the spindle drum 12, control sleeve 25 will be shifted toward the left, as viewed in Fig. 3, thereby to engage clutch 29 and, as previously described, to cause the gears 34 on the spindles 13 to rotate at a speed which is only slightly less than the normal rotational speed of the spindles. Then the slide 19 associated with the working position where a spindle is to be arrested displaced toward the left, as viewed in Fig. 3, thereby to disengage the coupling 17 and to engage the coupling 35. Since the gear 34 is rotating at a speed only slightly less than that of the spindle 13 and hence of the sleeve 18, engagement of the coupling 35 is facilitated. Following the engagement of the coupling 35, the related spindle 13 is rotated at a relatively high speed by the arresting drive embodying this invention.

Thereafter, the control sleeve 25 is shifted axially toward the right, as viewed in Fig. 3, to initially disengage the clutch 29 and then to apply the brake 39, thereby to arrest rotation of the spindle 13 having its coupling 35 in engaged condition. Since the recess 21 of the sleeve 18 may not register with the pin 20 when the related spindle 13 is brought to rest by the action of the brake 39, the control sleeve 25 is further shifted toward the right, as viewed in Fig. 3, thereby to release the brake 39 and to simultaneously engage the clutch 41 so that the housing 32, and hence the gears 34, are then rotated at a very slow speed until the pin 20 is received within the recess 21 of the sleeve 18 coupled to a gear 34. Thus, the spindle 13 to be arrested is brought to rest in a predetermined rotational position. When the spindle 13 has been stopped in the desired position, the control sleeve 25 then shifts slightly toward the left away from its extreme right hand position, as viewed in Fig. 3, in order to avoid slipping within the clutch 41 for an unnecessarily long period of time, and to partially apply the brake 39 so that the latter will assist in holding the arrested position 13 in its locked position. Such backward movement of the control sleeve 25 away from its extreme right hand position is, in any case, not sufficient to again effect engagement of the clutch 29.

After completion of the operations to be performed in the arrested position of the spindle, the above described shifting steps of the sleeve 25 are repeated in the reverse order following the withdrawal of the pin 20 from the recess 21 by suitable rocking of the associated lever 20c. Thus, following withdrawal of the pin 20, the clutch 41 is engaged to effect slow rotation of the spindle 13, then the clutch 41 is disengaged and the brake 39 is applied, and finally the brake 39 is released and the clutch 29 is engaged so that the spindle 13 is brought up to a high speed of rotation almost equal to that of the associated gear 16. Thereafter, the slide 19 can be shifted toward the right, as viewed in Fig. 3, to disengage the coupling 35 and to again engage the coupling 17 so that rotation of the spindle 13 is then again effected from the main drive formed by the gears 15 and 16.

In the embodiment of the invention described above with reference to Figs. 1 to 4, inclusive, of the drawings, each slide 19 at a working position where a spindle is to be arrested is provided with a pin 20 for determining the arrested position of the related work spindle. However, in the embodiment of the invention illustrated in Fig. 5, all of the spindles to be arrested are simultaneously locked in position by two axially extending locking pins 51 which are slidable in bores 51a formed in the control sleeve 25' and extending axially through bores 53 in the housing 24' to be received in axially opening recesses 54 in the housing 32' in order to lock the latter against rotation relative to the housing 24'. Compression springs 52 act axially against the pins 51 to urge the latter in the direction out of the control sleeve 25'. The movement of the locking pins 51 out of sleeve 25' is limited by collars 51b on the locking pins which are engageable with abutment rings 51c at the outer ends of the bores 51a. The collars 51b are axially disposed so that the ends of the pins 51 will project from the bores 53 for engagement in the recesses 54 only when the control sleeve 25' has been moved to its extreme position toward the right, as viewed in Fig. 5, for producing the very slow rotation of the housing 32' relative to the housing 24'. Thus, when the control sleeve 25' is in its extreme position toward the right, the ends of the locking pins will be urged against the end face of the housing 32' and will move into the recesses 54 when the latter are aligned with the pins 51.

It will be understood that, the embodiment of the invention illustrated in Fig. 5, the only departure from the first described embodiment resides in the substitution of the locking pins 51 for the locking pins 20, and that the housing 24', the control sleeve 25' and the housing 32' correspond to the previously described housing 24, control sleeve 25 and housing 32, respectively. With the arrangement shown in Fig. 5, all of the work spindles which are coupled to the auxiliary or arresting drive at the time when the control sleeve 25' is moved to its extreme position to the right, thereby to project the pins 51 into the recesses 54, will be simultaneously brought to rest.

Although illustrative embodiments of the invention have been described in detail herein with reference to the accompanying drawings, it is to be understood that the invention is not limited to these precise embodiments, and that various changes and modifications may be effected therein without departing from the scope or spirit of the invention, except as defined in the appended claims.

What is claimed is:

1. In combination with a multiple-spindle automatic lathe having a central drive shaft, a spindle drum turnable about the axis of the drive shaft and a plurality of work spindles rotatably carried by the drum for indexing movement past several working positions in response to turning of the drum; main drive means for all of the spindles and being driven from said central drive shaft; a single auxiliary drive means for all of said spindles including means for driving the auxiliary drive means from said central drive shaft at a relatively high speed, which is approximately the same as that at which said main drive means is effective to drive said spindles, and at a relatively low speed, respectively, and braking means for arresting said auxiliary drive means; coupling means for alternatively connecting each of the spindles to said main drive means and to said auxiliary drive means; control means for said auxiliary drive means effective to cause drive of the latter at said relatively high speed prior to the coupling of a spindle thereto and then to brake said auxiliary drive means prior to the driving of the latter at said relatively low speed; and locking means operative during the driving of said auxiliary drive means at said relatively low speed for holding each spindle coupled to said auxiliary drive means against further rotation.

2. In a multiple-spindle automatic lathe; the combination of a central drive shaft; a spindle drum turnable about the axis of the drive shaft; a plurality of work spindles rotatably carried by said drum and spaced equally from said axis for indexing movement past a plurality of working positions in response to turning of the drum; main drive means driven from said drive shaft and having a driven gear for each of said spindles; a single auxiliary drive means including a driven gear for each of said spindles, selectively operable means for driving said driven gears thereof from said central drive shaft at a relatively high speed, which is approximately the same as that at which the driven gears of said main drive means are rotated, and at a relatively low speed, respectively, and braking means for arresting the rotation of said driven gears of the auxiliary drive means, and control means for said selectively operable means and for said braking means effective to cause driving of said driven gears at said relatively low speed; coupling means for of said driven gears and then rotation of said driven gears at said relatively low speed; coupling means for each spindle operative to alternately couple the related spindle to said driven gears of said main drive means and auxiliary drive means, respectively; coupling actuating means at each working position of the lathe where rotation of a spindle is to be arrested and operative to cause said coupling means of the spindle at said position to couple the related spindle to said driven gear of the auxiliary drive means while the latter is driven at said relatively high speed, whereupon, the rotation of the spindle is braked and then resumed at said relatively low speed; and locking means operative during the rotation of said driven gears of the auxiliary drive means at said relatively low speed to halt the rotation of each spindle coupled to a driven gear of said auxiliary drive means upon the spindle reaching a predetermined rotational position.

3. In a multiple-spindle automatic lathe; the combination of a central drive shaft; a spindle drum turnable about the axis of said shaft; a plurality of work spindles rotatable in said drum and spaced equally from said axis for index movement past several working positions; first and second gears for each of said spindles; gear means driven by said shaft and meshing with said first gear of each spindle to form a main drive for the latter; auxiliary drive means for all of said spindles including a housing mounted on said drum, a drive member rotatable in said housing concentric with said shaft and carrying gear means meshing with said second gear of each spindle, brake means operative to resist rotation of said drive member relative to said housing, clutch means driven by said drive shaft and operative when engaged, to rotate said drive member at a relatively high speed, gear actuated means also driven by said drive shaft and operative to rotate said drive member at a relatively low speed, and control means effective to engage said clutch means for rotating the drive member at a relatively high speed, then to operate said brake means and then to operate said gear actuated means for rotating the drive member at a relatively low speed; coupling means for alternately connecting each spindle to the related first and second gears thereof; coupling operating means at least at one of said working positions to actuate the coupling means of the spindle at said one station for disconnecting the spindle from the related first gear and connecting the spindle to the related second gear while said drive member is being rotated at said relatively high speed; and locking means operative while said drive member is rotated at said relatively low speed to arrest the rotation of each spindle then coupled to the related second gear.

4. In a multiple-spindle automatic lathe; the combination as in claim 3, wherein said first and second gears for each spindle are rotatably mounted on the latter at axially spaced apart locations, and said coupling means for each spindle includes a sleeve slidable axially on the latter between the related first and second gears and held against rotation relative to the spindle, and cooperating means on each of said first and second gears and on the adjacent ends of said sleeve for rotatably connecting the latter to a selected one of said first and second gears in a predetermined rotational position of said sleeve relative to the selected gear when said sleeve is displaced axially along said spindle toward the selected gear.

5. In a multiple-spindle automatic lathe; the combination as in claim 4, wherein said locking means includes an individual locking pin at each working position where spindle rotation is to be arrested, and spring means urging the locking pin toward said sleeve on the spindle at the related working position, each sleeve on a spindle having a recess therein to receive said locking pin for individually arresting the rotation of the related spindle in a predetermined position.

6. In a multiple-spindle automatic lathe; the combination as in claim 4, wherein said locking means includes locking pins extending slidably through said housing and urged against said drive member when the latter is rotating at said relatively low speed, said drive member having recesses therein for receiving said locking pins, thereby to halt rotation of said drive member in a predetermined position and, hence, to arrest rotation of all spindles simultaneously connected to their related second gears.

7. In a multiple-spindle automatic lathe; the combination as in claim 3, wherein said clutch means operative to rotate said drive member at a relatively high speed includes an axial series of clutch discs concentric with said drive shaft and alternately connected with said drive shaft and drive member, respectively, said clutch discs being effective, when axially compacted, to cause said drive member to rotate with said drive shaft at the speed of the latter.

8. In a multiple-spindle automatic lathe; the combination as in claim 3, wherein said brake means includes a disc brake concentric with said shaft and having an axial series of brake discs alternately fixed to said drive member and housing respectively, to resist rotation of said drive member in response to axial compacting of said series of brake discs.

9. In a multiple-spindle automatic lathe; the combination as in claim 3, wherein said gear actuated means operative to rotate said drive member at a relatively low speed includes planetary gear means having an input gear fixed to said drive shaft and an output gear, and a disc clutch concentric with said drive shaft and having an axial series of clutching discs alternately fixed to said drive member and said output gear, respectively, to cause said drive member to be rotated from said drive shaft by way of said planetary gear means when said series of clutching discs is axially compacted, while slipping can occur in said disc clutch when said locking means becomes operative to arrest rotation of each spindle then coupled to the related second gear.

10. In a multiple-spindle automatic lathe; the combination as in claim 3, wherein said brake means includes a disc brake concentric with said shaft and having an axial series of brake discs alternately fixed to said drive member and housing, respectively, to resist rotation of said drive member in response to axial compacting of said series of brake discs, said clutch means operative to rotate said drive member at a relatively high speed includes a first disc clutch concentric with said drive and having an axial series of clutching discs alternately rotating with said drive member and drive shaft, respectively, to cause said drive member to rotate with said drive shaft at the speed of the latter when said series of clutching discs of the first disc clutch is axially compacted, and said gear actuated means operative to rotate said drive member at a relatively low speed includes planetary gear means having an input gear fixed to said drive shaft and an output gear concentric with said drive shaft, and a second disc clutch concentric with said drive shaft and having an axial series of clutching discs alternately fixed to said drive member and said output gear, respectively, to cause said drive member to be rotated from said drive shaft by way of said planetary gear means when said series of clutching discs of said second disc clutch is axially compacted.

11. In a multiple-spindle automatic lathe; the combination as in claim 10, wherein said control means includes a control member reciprocable in the direction of said axis of the drive shaft between extreme positions, means actuated by said control member to axial compact the series of clutching discs of said first disc clutch in one of said extreme positions, means actuated by said control member to axial compact said series of brake discs when said control member is disposed intermediate said extreme positions, and means actuated by said control member to axially compact the series of clutching discs of said second disc clutch when said control member is at the other of said extreme positions.

12. In a multiple-spindle automatic lathe; the combination as in claim 11, wherein said housing has a hollow extension coaxial with said drive shaft and the latter has a hollow end portion extending through said drive member, with axial slots formed in said end portion, said control member includes a sleeve slidable on said extension and having a plunger extending therefrom through said extension and said hollow end portion of the drive shaft, a diametrical pin carried by said plunger and extending through said slots of the hollow end portion, and a cam sleeve extending around said hollow end portion and connected to the opposite ends of said diametrical pin to move axially with said control sleeve relative to the drive shaft.

13. In a multiple-spindle automatic lathe; the combination as in claim 12, wherein said means actuated to compact the series of clutching discs of said first disc clutch includes a rockable bell-crank having a first arm engageable with an end of the related series of clutching discs and a second arm engageable by said cam sleeve in said one extreme position of the control member to rock said bell-crank in the direction for axially compacting the related series of clutching discs.

14. In a multiple-spindle automatic lathe; the combination as in claim 12, wherein said means actuated to compact the series of clutching discs of said second disc clutch includes an annular lip on an end of said cam sleeve bearing axially against one end of the related series of clutching discs in said other extreme position of the control member.

15. In a multiple-spindle automatic lathe; the combination as in claim 12, wherein said means to compact said series of brake discs includes a bell-crank rockably mounted on said housing and having a first arm extending generally parallel to the axis of the drive shaft and projecting over said control sleeve and a second arm engageable against an end of said series of brake discs, and an annular ridge on said control sleeve engaging said first arm of the bell-crank to rock the latter in the direction pressing said second arm against said series of brake discs when said control member is in said intermediate position.

16. In a multiple-spindle automatic lathe; the combination as in claim 11, wherein said control member includes a control sleeve co-axial with said drive shaft and having an annular, radially outward groove therein, and said control means further includes a control lever for each spindle mounted on said housing for rocking in a plane extending radially from said axis of the drive shaft and for movement with said spindle drum during indexing of the latter, each control lever engaging, at one end, in said groove of said control sleeve so that the latter is displaced axially in response to rocking of any control lever, at least one cam slide disposed to receive the other end of the control lever associated with the spindle then disposed at the working position where rotation of the latter is to be arrested, and cam actuated means operative to displace said cam slide for effecting rocking of the control lever then received in said cam slide.

References Cited in the file of this patent
UNITED STATES PATENTS

| | | |
|---|---|---|
| 2,140,019 | Lewis | Dec. 13, 1938 |
| 2,646,152 | Retz | July 21, 1953 |
| 2,774,250 | Gallimore | Dec. 18, 1956 |